United States Patent [19]
Campos

[11] 3,974,746
[45] Aug. 17, 1976

[54] MONO-SEAL PUMP PISTON

[76] Inventor: Senobio Campos, 24001 Muirlands, Space 72, El Toro, Calif. 92630

[22] Filed: May 5, 1975

[21] Appl. No.: 574,307

[52] U.S. Cl. .................................. 92/244; 92/258
[51] Int. Cl.² ........................ F16J 1/00; F16J 1/12
[58] Field of Search .................. 92/244, 243, 258; 277/166, 188, 212 C

[56] References Cited
UNITED STATES PATENTS

| | | | |
|---|---|---|---|
| 1,577,732 | 3/1926 | Lamb | 92/243 X |
| 2,119,419 | 5/1938 | Clench | 92/244 X |
| 2,341,803 | 2/1944 | Mott | 92/244 |
| 2,403,020 | 7/1946 | Parsons | 92/244 X |
| 2,443,110 | 6/1948 | MacClatchie | 277/166 X |
| 2,526,465 | 10/1950 | Francis, Jr. | 92/244 |
| 2,859,078 | 11/1958 | Jacobs | 92/244 |
| 3,094,904 | 6/1963 | Healy | 92/244 X |

*Primary Examiner*—Irwin C. Cohen

[57] ABSTRACT

A mono-seal pump piston comprising a mono-seal assembly including a central seal-supporting hub having a plurality of annular support ribs and a pair of resilient seals oppositely disposed on either side of the supporting hub, the seals including an outer annular sealing lip for sealing engagement with an inner wall of a pump cylinder and an inner annular seaing lip for sealing engagement about the piston rod which passes therethrough. The pump piston is retained on the piston rod by a pair of mounting followers positioned on either side of the piston assembly and held thereon by a nut.

4 Claims, 4 Drawing Figures

U.S. Patent  Aug. 17, 1976  3,974,746
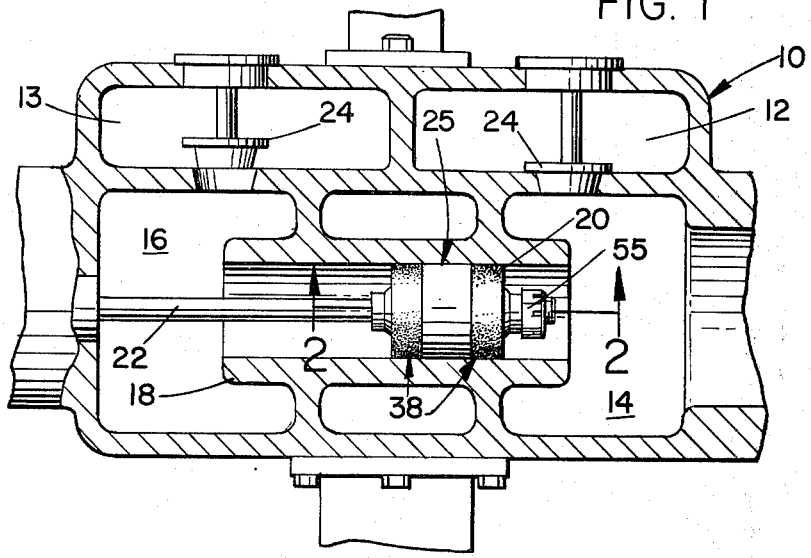
FIG. 1
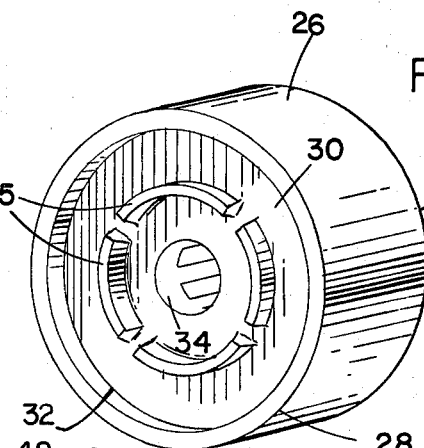
FIG. 3
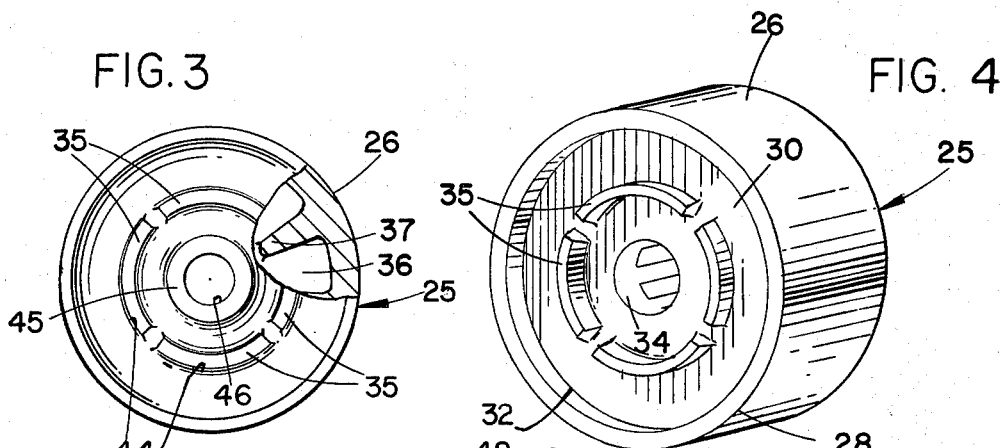
FIG. 4
FIG. 2

MONO-SEAL PUMP PISTON

BACKGROUND OF THE INVENTION

1. Field of the Invention

This invention relates to a pump piston and, more particularly, to a pump piston that has a sealing means independent of the pressure applied by the hub thereto when operating within a pump cylinder.

2. Description of the Prior Art

At the present time, there is a great variety of pump pistons, generally each being designed for a particular pump. As is well known in the art, various problems and difficulties are encountered in providing a piston that is positive in its sealing arrangement, whereby after a short period of time the pumping material seeps past the piston and causes damage to the piston cylinder and rod as well as to the sealing means therein.

Also, there is lacking a piston that can be operated for long periods of time when exposed to high pressures and abrasive materials that might be pumped therethrough, such as oil well sump mud.

Other problems encountered with many pistons are in their repair and replacement.

Some of the well known and often used pistons are illustrated in various U.S. patents. As an example, U.S. Pat. No. 2,349,784 shows a single piston head slidably disposed within a cylinder.

Patents which go back to the year of 1895, such as U.S. Pat. No. 541,682, illustrate the typical piston having the well known packings with annular-extending lips as indicated.

Again, a very similar piston is shown in U.S. Pat. No. 1,335,051 which in this case is applied to an air pump.

U.S. Pat. Nos. 528,378, 391,435 and 764,900 all provide two reverse cup-shaped packings clamped between respective support discs.

Hence, there is a need for a pump piston capable of being used in various devices under many different conditions.

SUMMARY OF THE INVENTION

The present invention relates to a mono-seal pump piston designed for large pumping systems of the type found in the oil well industry. Such pumps are used to move large quantities of abrasive sludge and oil well sump mud. However, the uniqueness of the design of the present invention allows it to be incorporated in the most simple form of pump device.

The mono-seal pump piston comprises a pump-seal assembly having a central-supporting hub, the hub being formed within the outer circular wall which is provided with laterally extending, annular, lip members defining cavities on opposite sides of the hub. Each end wall of the drum includes a plurality of annular rib-support members integrally formed thereon.

A pair of flexible sealing rings are arranged to be fitted to each side of the hub and received within the cavities thereof. Each sealing ring is formed with an outer, annular, sealing lip which has a larger diameter than that of the circular wall of the drum, and an inner, annular, sealing lip forming the leading edge of a central opening in the sealing ring, wherein the lip provides a positive sealing action against the piston rod that passes therethrough.

Accordingly, the outer and inner lips prevent liquid or pressure from transferring from one side to the other, whether under pressure or not within the cylinder. The sealing rings are also provided with arcuate openings to receive the rib member therethrough, whereby mounting followers can directly abut the ribs when the assembled piston is mounted to the piston rod by a nut. Thus, the mounting load of the piston does not affect the sealing rings.

It should be noted that, due to the present design of the piston, it is not necessary to remove the pump piston rod from the pump when the mono-seal piston is to be mounted thereon or to be repaired.

OBJECTS AND ADVANTAGES OF THE INVENTION

The present invention has for an important object a provision whereby a pump piston is adapted to be slidably sealed within the pump cylinder without the aid of the pressure within the cylinder.

It is another object of the invention to provide a mono-seal pump piston having a central hub adapted to have a pair of sealing rings oppositely disposed on either side of said hub, wherein the mounting followers do not directly engage said rings.

It is still another object of the invention to provide a mono-seal pump piston that can be repaired and completely changed without the need for removing the pump piston rod.

It is further an object of the invention to provide a mono-seal pump piston having relatively few parts and operating in such a manner as to cut the repair time of the average pump device by two-thirds.

It is still a further object of the invention to provide a mono-seal pump piston of this character that is easy to service and maintain, and that is relatively inexpensive to manufacture.

It is still another object to provide a pump piston of this character that is simple and rugged in construction, having a single central hub member adapted to have interchangeable sealing rings affixed thereto.

Still another object of the invention is to provide a mono-seal pump piston wherein the generated reciprocated load is transferred to the rod nut and rod shoulder through the followers and support ribs of the hub member.

The characteristics and advantages of the invention are further sufficiently referred to in connection with the accompanying drawings, which represent one embodiment. After considering this example, skilled persons will understand that variations may be made without departing from the principles disclosed and I contemplate the employment of any structure, arrangements or modes of operation that are properly within the scope of the appended claims.

DESCRIPTION OF THE DRAWINGS

Referring more particularly to the accompanying drawings, which are for illustrative purposes only:

FIG. 1 is a cross-sectional view of a portion of a pump showing the present invention slidably disposed within a pump cylinder;

FIG. 2 is an enlarged cross-sectional view of the piston taken substantially along line 2—2 of FIG. 1, wherein the piston is not positioned in the cylinder thereof;

FIG. 3 is an elevational end view of the piston assembly without the nut, shaft and follower, thus illustrating the annular ribs therein; and FIG. 4 is a perspective view illustrating the central hub member of the piston assembly.

DESCRIPTION OF THE PREFERRED EMBODIMENT

Referring more particularly to FIG. 1, there is shown a portion of a pump device, generally indicated at 10, having various pump compartments 12, 13, 14 and 16. Positioned between compartments 14, and 16 is a pump cylinder 18 adapted to receive the present invention, that being a mono-seal pump piston, indicated generally at 20.

The piston 20 is mounted and secured to the reciprocal pump piston rod 22. As the piston rod 22 reciprocates within the cylinder 18, the piston assembly forces fluid from compartments 14 and 16, respectively, into compartment 12 and 13 through valve means 24. However, the description of this particular pump device as shown is given only as an example.

The present invention has been particularly designed to provide a positive seal within the cylinder, regardless of the types of fluids pumped through the pump, such as muds having abrasive materials disposed therein.

The mono-seal pump piston comprises a centrally disposed support hub, generally indicated by numeral 25, said hub being integrally formed with an outer circular wall 26 having laterally extended, outer, edge lips 28. Said lips 28, along with the hub side walls 30, define a cavity 32. Walls 30 are provided with a centrally-aligned opening 34, wherein the walls also include outwardly projecting ribs 35, the ribs being arcuately formed and positioned between the outer lips 28 and the central openings 34. Each wall 30 is shown with at least four rib members 35 juxtaposed in an annular relationship.

Thus, to provide a very light but rigid construction, the outer wall 26 and the side walls 30 form a hollow compartment 36, the compartment 36 having a plurality of radially extending rib members 36 integrally formed therein, as seen in FIGS. 2 and 3.

Fixedly secured within each cavity 32 is a sealing means indicated at 38. The sealing means comprises a sealing ring consisting of plastic or rubber, or a combination thereof. The specific material would be determined by the particular use, under each condition. Each sealing ring is identical — hence, a description of one will suffice. The rings are formed to fit the form and design of the side walls 30 and the cavities 32 formed thereby. The sealing ring comprises an annular wall 40, the inner edge 42 thereof being secured adjacent to lip 28 of the hub and at that point having the same general diameter as that of the hub outer wall 26. Said wall 40 extends laterally therefrom and it inclines outwardly to provide a diameter greater than the diameter of the hub 25. The terminating free end of the wall 40 defines an annular substantially-flat lip 43. This lip 43 and the inclined surface of the annular wall 40 provide a positive seal between the piston and the piston cylinder wall. This, then, allows a perfect seal therebetween either in an operative or a non-operative mode.

The sealing ring is further provided with a plurality of open slots 44 formed to receive each matching rib member 35 whereby said rib members are allowed to extend therethrough; and a centrally-disposed sealing lip 45 having an opening 46 therein wherein the wall of said opening 46 is inclined inwardly and outwardly, thereby providing a sealing surface 48 that has a diameter smaller than piston rod 22 that passes therethrough, said opening 46 and said opening 34 of wall 30 being co-aligned.

It, therefore, can be seen that a second positive seal between one side of the piston assembly and the other takes place with the direct engagement of surfaces 48 with rod 22.

When the mono-seal pump piston 20 is mounted to the piston rod 22, there is first provided a protective cap (not shown) that is positioned over the threads 49 of the rod 22. The follower 50 is then installed to abut against the shoulder 52 formed by the enlarged portion 54 of the rod 22. This is followed by sliding the entire mono-seal pump piston assembly over the rod 22, whereby the first follower abuts between the shoulder 52 and exposed annular rib members 35, as shown in FIG. 2. Then the protective cap is removed and a second follower is installed which also directly engages the rib member 35 of the hub 25. A nut 55 is secured to the threaded end 49 of the rod 22 and is tightened thereon. The force of the nut 52 is transmitted to follower 50 through hub 25 by way of ribs 35 to the first follower which abuts shoulder 52. When the nut is in position, a cotter pin 56 is mounted in a typical manner to prevent the nut 55 from coming loose.

Therefore, it can be understood that no pressure is directly applied to the sealing means by any of the mounting members thereof.

This invention and its attendant advantages will be understood from the foregoing description and it will be apparent that various changes may be made in the form, construction and arrangement of the parts of the invention without departing from the spirit and scope thereof or sacrificing its material advantages, the arrangement herein before described being merely by way of example, and I do not wish to be restricted to the specific form shown or uses mentioned, except as defined in the accompanying claims.

I claim:

1. A mono-seal pump for mounting on a reciprocal piston rod, said piston comprising:
   a piston rod;
   a central-supporting hub having an outer circular wall, a pair of side walls, each of said side walls having a central disposed opening therein aligned to receive said piston rod therethrough for removably mounting thereon;
   a plurality of rib members extending outwardly from each of said side walls and integrally formed thereon;
   a pair of resilient sealing rings, one of each being secured to oppositely disposed side walls of said central-supporting hub, said sealing rings having an annular wall inclined outwardly forming a sealing surface thereon, an inner annular wall central opening disposed therein being arranged for alignment with said central opening of said side walls, wherein the inner annular wall of said opening in said sealing ring is inclined downwardly and outwardly to form an extended sealing surface for engagement with said piston rod, and wherein each of said sealing rings includes a plurality of slots therein to receive said rib members of said hub, whereby said rib members pass through respective slots; and
   follower securement means connected to said piston rod and abutting the rib members which pass through the slots of said sealing rings.

2. A mono-seal pump piston as recited in claim 1, wherein said follower securement means comprises a pair of follower member, each being located on opposite sides of said piston and arranged for direct engagement with said rib members of said walls, whereby the force required to mount said piston is transferred through said hub and wherein the sealing rings are freely supported by the hub.

3. A mono-seal pump piston as recited in claim 1, wherein said outer circular wall includes an annular lip extending laterally outward from each side of said outer wall of said hub member and formed as an integral part thereof, wherein each of said lips with the respective side walls define a cavity in which said sealing rings are fixedly received therein.

4. A mono-seal pump piston as recited in claim 3, wherein said rib members are arcuately formed in a circular juxtaposed arrangement, and wherein said slots in said sealing ring are formed in a similar manner to receive said respective rib members.

* * * * *